United States Patent [19]

Nilsson

[11] Patent Number: 4,529,509
[45] Date of Patent: Jul. 16, 1985

[54] SCREEN MACHINE

[76] Inventor: Harry Nilsson, Nägeliweg 7, CH Tägerwilen, Switzerland

[21] Appl. No.: 557,152

[22] PCT Filed: Feb. 8, 1983

[86] PCT No.: PCT/SE83/00042
§ 371 Date: Oct. 7, 1983
§ 102(e) Date: Oct. 7, 1983

[87] PCT Pub. No.: WO83/02731
PCT Pub. Date: Aug. 18, 1983

[30] Foreign Application Priority Data

Feb. 10, 1982 [SE] Sweden ................ 8200787

[51] Int. Cl.³ .................................. B07B 1/22
[52] U.S. Cl. .................... 209/270; 209/380; 210/393; 210/404; 210/408
[58] Field of Search ............ 209/270, 380; 210/393, 210/404, 408

[56] References Cited

U.S. PATENT DOCUMENTS

| 1,429,707 | 9/1922 | Baker et al. | 209/270 |
| 2,352,303 | 6/1944 | Young | 210/393 |
| 2,707,905 | 5/1955 | Mathewson | 209/270 |
| 3,276,584 | 10/1966 | Mathewson | 209/270 |
| 3,404,065 | 10/1968 | Ingemarsson | 209/270 |
| 3,452,875 | 7/1969 | Rich et al. | 209/270 |
| 3,616,904 | 11/1971 | Aremaa | 209/380 |
| 3,627,139 | 12/1971 | Burtsev | 210/393 |
| 3,750,885 | 8/1973 | Fournier | 210/107 |
| 4,266,413 | 5/1981 | Yli-Vakkuri | 210/404 |

Primary Examiner—Tim Miles
Attorney, Agent, or Firm—Pollock, Vande Sande & Priddy

[57] ABSTRACT

A screen machine, particularly for cellulose pulp and recycled pulp, which includes a screen rotor (15), which is rotatable in a housing (16) having an inlet (17) for pulp suspension, an outlet (18) for accepts and a discharge opening (19) for rejects. The screen rotor (15) is so arranged between the inlet (17) and the outlet (18) that flow therethrough from its inlet side has a radially inward directed component. On the outlet side of the rotor (15) is arranged at least one stationary baffle means (26), which separates a sector of the screen rotor from the outlet. Along at least a part of this sector there is communication between the inlet (17) and the space between the rotor (15) and the baffle means (26).

7 Claims, 2 Drawing Figures

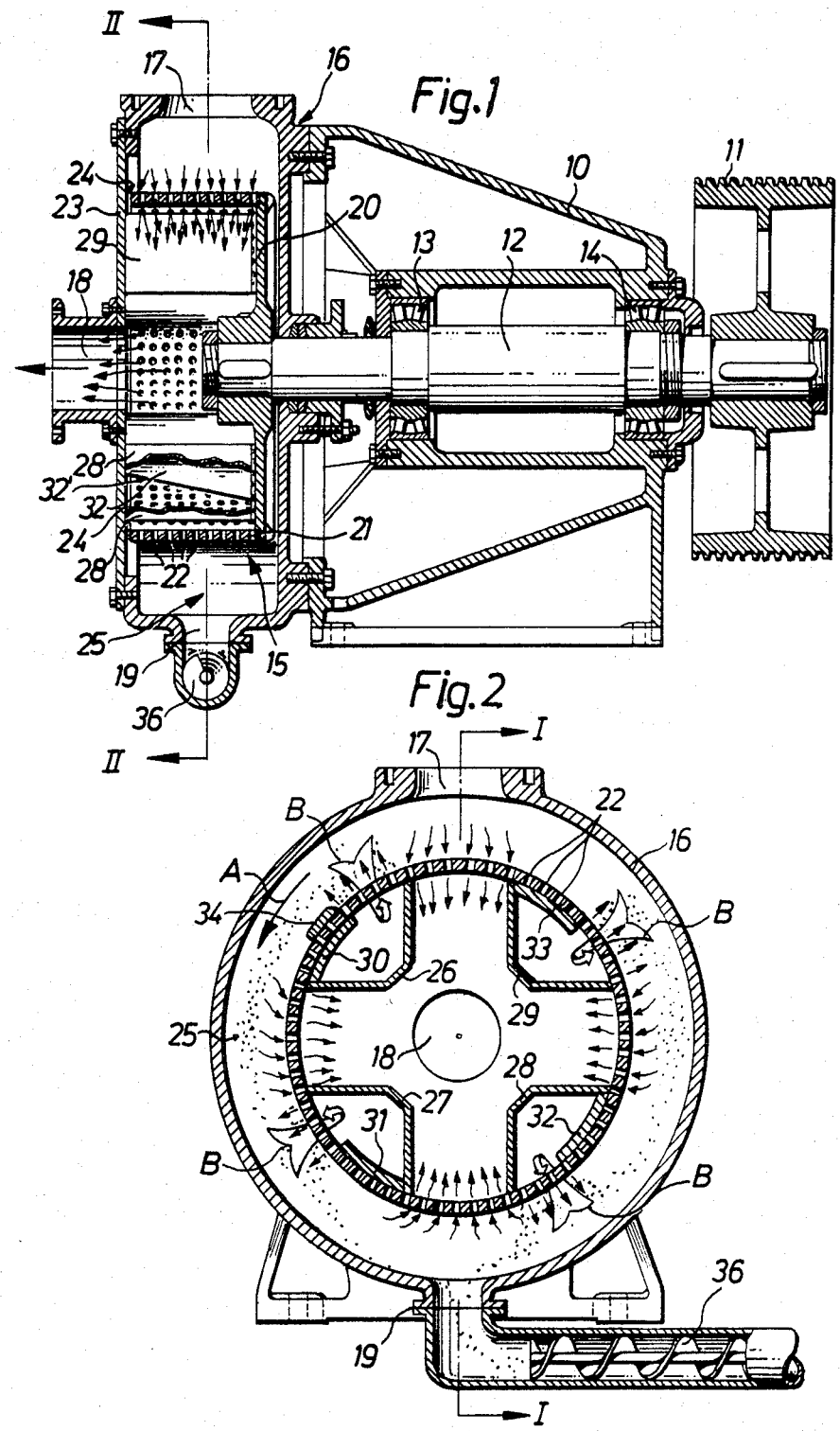

SCREEN MACHINE

The present invention concerns a screen machine, preferably for cellulose pulp and recycled pulp, including a screen rotor which is rotatable within a housing having an inlet for unscreened suspension, an outlet for accepts and a discharge opening for rejects.

From U.S. Pat. No. 1,429,707 is known a pulp screen of this kind having a cylindrical screen drum and self-clearing action. The pulp is fed into one end of the drum and is forced to rotate with the drum by means of blades. By the action of centrifugal force, fibers and water are forced radially outwards through the screen slots. The casing of the machine is elliptical, and thus at two points the casing is located closer to the drum than at other points. At these two points, therefore, the screened pulp located outside the drum and also rotating therewith will be "compressed" and cause a backflow radially inward through the screen slots. Thereby these are cleared of oversize fibers, etc., which are discharged at the other end of the drum.

The screen machine according to the present invention also has a self-clearing action which, however, results from the utilization of centrifugal force.

The essential object of the invention, thus, is to clear screen holes in a screen rotor by means of centrifugal force immediately after each screen zone, within which screening takes place against the action of centrifugal force. Cylindrical as well as conical screen drums can be contemplated, as well as disc-shaped screen rotors; in the latter case, of course, the screen holes will have to be inclined against the axis of rotation in order to obtain centrifugal pumping action.

An embodiment of the invention will now be described with reference to the accompanying drawing, wherein FIG. 1 is an axial section through a machine according to the invention, and FIG. 2 is a section along line II—II of FIG. 1.

FIG. 1 shows a machine casing 10, in which a shaft 12 driveable by a pulley 11 is journalled in bearings 13, 14. In the other end of shaft 12 is mounted a screen rotor 15 for rotation with the shaft, said rotor being concentrically located within a substantially cylindrical screen housing 16.

In the example shown, the shaft 12 is horizontal and the screen housing 16 is provided with an inlet 17 for unscreened stock located at the top of the periphery, a central outlet 18 for screened stock (accepts) coaxial with the screen rotor 15, and a selectively openable discharge opening 19 for non-screenable goods (rejects). The screen rotor 15 has a tight hub disc 20 attached to the shaft 12 and an envelope plate 21 arranged at the periphery of the hub disc, the envelope disc being provided with a plurality of screen openings 22. Straight in front of the hub disc 20 the screen rotor 15 is open towards the wall 23 of the screen housing, in which the outlet 18 is disposed. Between the wall 23 and the edge of the envelope plate 21 there is an interspace 24.

The arrangement is such that the pulp suspension flows from the inlet 17, via the annular space 25 between the housing 16 and the rotor wall 21 through the screen openings, and to the outlet 18, whether the rotor is rotating or not.

The pressure of the stock at the inlet 17 and within the annular space 25 is thus so much greater than the pressure in the outlet 18 that a flow takes place radially inwards through the screen openings 22 in spite of rotation of the rotor. This flow is indicated in FIG. 2 by small arrows at approximately 12, 3, 6 and 9 o'clock positions.

According to the invention, within the rotor are arranged a number of fixed baffle plates 26, 27, 28, 29 shutting off one sector each of the interior of the rotor from the outlet 18. The baffle plates 26 to 29 thus extend from the wall 23 of the screen housing into the rotor, and terminate immediately adjacent the hub disc 20.

As mentioned above, there is an interspace 24 between the wall 23 and the open end of the rotor drum. Because of this interspace, the pressure of the annular space 25 exists also within the sectors defined by the rotor envelope 21 and the baffle plates 26 to 29.

Upon rotation of the rotor in the direction of arrow A in FIG. 2, screening thus takes place through the four portions of the screen plate 21 that are temporarily located between the baffle plates 29 and 26, 26 and 27, 27 and 28, and 28 and 29. As in all screens, clogging of the screen openings occurs, in this case on the outside of the screen plate 21, due to the radially inward screening.

By means of the baffle plates 26 to 29 according to the invention, however, after each screening zone is caused an automatic clearing of the screen openings. This clearing is achieved by the action of the centrifugal force on the water columns that are in screen openings within the effective area of the baffle plates. Within the screening zones the centrifugal force is not capable of neutralizing the pressure difference between the outside of the rotor and its inside; this, however, is possible inside the baffle plates, where the outside pressure also prevails on the inside of the baffle plates. As soon as the rotor has rotated to a sector defined by a baffle plate, the water column present in the respective screen hole is thrust out, and with it the fibres, staples and other things, that may have clogged a screen opening. Replacement of the water or the suspension thusly centrifugally pumped out of the space between the baffle plates and the drum wall 21 takes place by flow through the interspace 24, as indicated by small arrows at approximately 11, 8, 5 and 2 o'clock positions in FIG. 2.

In order to restrict the arc along which the centrifugal pumping takes place, plates 30 to 33 adapted to the curvature of the drum 21, are installed along the latter part of the effective sector of the respective baffle plate. This prevents particles that have just been thrust out from immediately turning inwards, and permits them to undisturbedly leave the immediate vicinity of the screen openings.

Advantageously the edges of the plates 30-33 turned against the direction of rotation of the rotor are inclined towards the interspace 24, so that flow into the rotor is counteracted and some scraping action is obtained. In FIG. 1, the baffle plate 28 is shown in partial section so that the plate 32 with its inclined edge 32' is visible.

Advantageously scrapers can be arranged on the outside of the screen rotor at suitable locations along the clearing zones. An example of such a scraper 34 is shown in FIG. 2 within the clearing zone of the baffle plate 26.

In summary, the machine according to the invention has the following features:

the suspension to be screened is supplied on one side of the rotor such that screening takes place radially inward;

screening flow through the screen rotor exclusively takes place due to the difference in suspension pressure at the inlet and outlet of the machine;

intentional rotation of the suspension does not take place either inside or outside the rotor;

the centrifugal force, which acts throughout on the suspension which is present temporarily in the screen openings and thus there rotates with the rotor, is allowed to act only within those zones where the baffle plates separate the rotor from the pressure of the outlet which is low relative to the pressure of the inlet.

Particles that are cleared off the rotor are collected at the discharge opening 19 and may, if desired, discharged by means of, e.g., a screw 36.

I claim:

1. A screen machine particularly for cellulose pulp and recycled pulp, including a screen means (15) rotatable about a rotational axis and mounted in a housing (16) having an inlet (17) for pulp suspension, an outlet (18) for accepts, and a discharge opening (19) for rejects, said screen means (15) being so arranged between said inlet (17) and said outlet (18) that flow therethrough from its inlet side to its outlet side has a component directed towards the rotational axis, at least one stationary baffle means (26) arranged on the outlet side of said screen means (15) separating a sector of said screen means from said outlet (18), and there being communication along at least a part of this sector between said inlet (17) and the space between said screen means (15) and said baffle means (26), whereby the flow, taking place against the action of the centrifugal force upon rotation of said screen means, is discontinued within said sector and is replaced by a counter-directed flow dependent on the centrifugal force.

2. A screen machine according to claim 1, wherein said screen means comprises a drum (21) and said communication takes place around an edge of said drum.

3. A screen machine according to claim 2, wherein said communication takes place through an interspace (24) between a wall (23) of said housing (16) and said drum edge.

4. A screen machine according to claim 1 or claim 2, wherein said drum (15) is open at one end towards said wall (23), and said baffle means (26) is attached to said wall and extends in the direction of the axis of said drum to the other end (20) of said drum.

5. A screen machine according to any one of claims 1 to 3, wherein said outlet (18) is coaxial with said drum (15) and located in said wall (23), a plurality of evenly distributed baffle means (26 to 29) being arranged within said drum (15).

6. A screen machine according to claim 5, wherein between each of said baffle means (26 to 29) and said screen means (21) is arranged a fixed obstructing means (30 to 33) preventing flow through said screen means.

7. A screen machine according to any one of claims 1 to 3, comprising at least one scraper (34) on the inlet side of said screen means (15).

* * * * *